United States Patent [19]

Bodine et al.

[11] 4,000,076
[45] Dec. 28, 1976

[54] DRILLING MUD HAVING REDUCED CORROSIVENESS

[75] Inventors: Oliver K. Bodine, Lima, Peru; Charles A. Sauber, Bartlesville, Okla.

[73] Assignee: Phillips Petroleum Company, Bartlesville, Okla.

[22] Filed: June 14, 1974

[21] Appl. No.: 479,496

[52] U.S. Cl. .......... 252/8.5 A; 252/8.5 B; 252/387

[51] Int. Cl.$^2$ .......... C09K 7/04; C09K 7/02

[58] Field of Search .......... 252/8.5 A, 8.5 B, 8.5 C, 252/8.55 E, 387

[56] References Cited

UNITED STATES PATENTS

| 2,073,413 | 3/1937 | Cross et al. | 252/8.5 |
|---|---|---|---|
| 2,280,997 | 4/1942 | Booth | 252/8.5 |
| 2,357,565 | 9/1944 | Vietti et al. | 252/8.5 |
| 2,425,768 | 8/1947 | Wagner | 252/8.5 |
| 2,452,021 | 10/1948 | Wayne | 252/8.5 |
| 2,479,061 | 8/1949 | Denton | 252/8.5 |
| 2,711,391 | 6/1955 | Kahler | 252/387 |
| 3,017,351 | 1/1962 | Scott et al. | 252/8.5 |
| 3,668,122 | 6/1972 | Branscum | 252/8.5 |
| 3,738,437 | 6/1973 | Scheuerman | 252/8.5 |
| 3,872,018 | 3/1975 | Alexander | 252/8.5 |
| R23,740 | 11/1953 | Ryznar et al. | 252/387 X |

OTHER PUBLICATIONS

Uhlig, The Corrosion Handbook, Pub. 1948 by Wiley & Son, N.Y., pp. 913-915.

Primary Examiner—Herbert B. Guynn

[57] ABSTRACT

A phosphate added to a drilling mud, e.g., a drilling mud containing a pitting-type or other corrosion producing component such as potassium chloride, significantly reduces corrosiveness and converts any residual corrosiveness to a general, as distinguished from a pitting type.

7 Claims, No Drawings

DRILLING MUD HAVING REDUCED CORROSIVENESS

This invention relates to a drilling mud. More particularly, it relates to a drilling mud having a reduced corrosiveness. Still more particularly it relates to such a mud having a general, as distinguished from a pitting, type of corrosiveness.

In one of its aspects the invention relates to the incorporation of a modifying additive into a drilling mud, for example, a bentonite clay type drilling mud.

In one of its concepts the invention provides for the incorporation of a minor amount of an additive to a drilling fluid composition which ordinarily is characterized by its corrosiveness, particularly by the fact that its corrosiveness causes a pitting of the metal with which it comes into contact, for example, a drill stem or pipe. In another of its concepts, the invention provides for the addition of a small but effective amount of diammonium phosphate or its functional equivalent to a usual type drilling mud or fluid. In a further concept still the invention provides a new drilling fluid or mud composition having reduced corrosiveness and, importantly, having a general, as distinguished from a pitting, type of corrosion effect.

Inhibited non-dispersed drilling muds containing potassium chloride, sodium chloride or sodium sulfate are used in certain areas to minimize drilling problems. Non-dispersed muds contain no thinner, that is, various organic agents (tannins, lignins, lignosulfonates, etc.) and inorganic agents that are added to a drilling fluid to reduce the viscosity and/or thixotropic properties. API Bulletin D11 First Edition December 1965. Such muds have a feature of preventing the swelling of clay or shale formations and minimizing mud making or breaking down of cuttings during drilling operations. Potassium chloride muds and sodium chloride muds are used widely. Potassium chloride muds are lightweight muds and are preferred for some situations over the more common sodium chloride muds.

Non-dispersed muds tend to trap air therein, and this air leads to oxygen-type corrosion. The invention applies particulaly to non-dispersed muds, which are more corrosive than dispersed muds.

Potassium chloride containing muds tend to cause corrosion of drilling tools, specifically drill pipe. The corrosion usually caused by potassium chloride solutions such as those used as drilling fluids takes the form of pitting corrosion. This is a highly localized type of metal loss which weakens the drill pipe so that washouts and twist-offs may occur. Drill pipe failures of these types are highly undesirable; they involve considerable monetary loss and delay in completing the well.

We have now discovered that the addition of a small but effective amount of diammonium orthophosphate to a potassium chloride drilling fluid materially will reduce its corrosiveness. More importantly, this additive will change the type of corrosion experienced from a pitting type to a general, fairly uniform corrosion over the entire surface exposed to corrosion.

It is an object of this invention to provide a drilling mud. It is another object of this invention to provide a method for drilling or boring into the ground as in the drilling of a well or oil well. It is a further object of this invention to provide an improved drilling mud having reduced corrosiveness. It is a further object of this invention to provide such a mud which has a general, as distinguished from a pitting, type of corrosiveness. Still further, it is an object of this invention to provide an improved drilling mud using process in which drill stands or pipe and related equipment will last longer because of reduced and type of corrosiveness exhibited by the mud or fluid used.

According to the present invention, there is provided an improved non-dispersed drilling mud or fluid containing, say, potassium chloride, sodium chloride or sodium sulfate and also a small but effective amount of a phosphate, e.g., a soluble orthophosphate or polyphosphate, as further described below.

The present invention has been demonstrated with diammonium orthophosphate but, based on similar chemical properties, it appears that other soluble orthophosphates will also provide this advantage. Hence, other soluble orthophosphates such as monoammonium phosphate, the mono- and dialkali metal phosphates, and liquid mixtures of polyphosphates, which are used in formulating fertilizers, are also within the scope of the present invention.

Specific examples of such materials are diammonium phosphate, monoammonium phosphate, dipotassium phosphate, monosodium phosphate, monolithium phosphate, dirubidium phosphate, sodium mixed polyphosphates, and the like, and mixtures thereof.

The presently preferred species is diammonium phosphate because of its ready availability and low cost, and because it is believed that the ammonium ion is a good clay inhibitor and causes hydrothermal changes in the clay itself. It is believed that diammonium phosphate allows use of less KCl than does disodium phosphate, for example.

Laboratory tests have been made which demonstrate the invention.

EXAMPLE I

Corrosion tests were carried out to illustrate the invention. Results and conditions are shown in Table I below.

TABLE I

| | CORROSION TESTS* IN 2% BY WEIGHT KCl SOLUTION | | |
|---|---|---|---|
| | Solution | Corrosion Rate, mpy vs Coupon Exposure: | |
| Corrosion Type | pH | Coupons Wholly Immersed | Coupons Half-Way Immersed |
| Solution No. 1 | - No inhibitor | | |
| General | 7.4 | 2.301 | 7.574 |
| Solution No. 2 | - 2% (7 ppb) | soda ash and 0.1% (0.35 ppb) NaOH | |
| Pitting | 11.2 | 2.106 | 3.570 |
| Solution No. 3 | - 0.25% (0.88 ppb) | diammonium phosphate (DAP) | |
| Localized** | 7.7 | 1.962 | 3.656 |
| Solution No. 4 | - 0.75% (2.62 ppb) | DAP | |
| General | 7.8 | 0.674 | 1.202 |
| Solution No. 5 | - 1.50% (5.25 ppb) | DAP | |

TABLE I-continued

CORROSION TESTS* IN 2% BY WEIGHT KCl SOLUTION

| Corrosion Type | Solution pH | Corrosion Rate, mpy vs Coupon Exposure: | |
|---|---|---|---|
| | | Coupons Wholly Immersed | Coupons Half-Way Immersed |
| General | 7.8 | 0.763 | 1.185 |

*Four low-carbon steel coupons aged statically for 14 days at room temperature in each solution. Two coupons wholly immersed and 2 coupons half-way immersed in the same solution by means of a glass rack. Corrosion rate is an average for two coupons except for solution No. 2 where the weight loss of only one coupon in the liquid-vapor exposure is shown (the other result seemed anomalous considering all the data and the reproducibility of these tests).
**Localized corrosion occurred where the coupon holder apparently hindered contact with this weak DAP solution and crevice-type cells were set up. Otherwise, the weight losses of these coupons would have been much lower.

The data in Table I show that solution No. 3, 0.25% diammonium phosphate at natural pH gave an average corrosion rate of 3.656 mpy (mils per year = thousandths of an inch per year) for the halfway immersed coupons. This is about the same rate as for Solution No. 2, a buffered solution of sodium hydroxide at pH 11.2, and is much lower than for the control Solution No. 1. The poor results of Solution No. 2 also points out that the corrosivity of the KCl solution cannot be satisfactorily reduced merely by raising the pH.

Solution No. 4, containing 0.75% diammonium phosphate and Solution No. 5, containing 1.5% diammonium phosphate, both at natural pH gave average corrosion rates of 1.202 and 1.185 mpy, respectively. These rates are considerably lower than for Solutions No. 1 and No. 2.

An important feature of the invention is disclosed in Table I; namely, that corrosion experienced by the coupons subjected to Solutions Nos. 3, 4, and 5 was general rather than pitting type. This significantly reduces the possibility of washout or twistoff of the drill pipe. Where pitting occurs, the corrosion is so serious that the measured corrosion rate is only of academic interest.

EXAMPLE II

In still another simple corrosion test, the effectiveness of the combination of KCl and diammonium phosphate was demonstrated in a simulated inhibited drilling mud.

Mild steel nails were aged three days in mud samples containing 40 ppb bentonite clay, city tap water, and the indicated amounts of diammonium phosphate and KCl. The results are shown in Table II below.

TABLE II

| Salts, Pounds Per Barrel | | Corroded |
|---|---|---|
| DAP | HCl | |
| 5 | 0 | No |
| 4 | 1 | No |
| 3 | 2 | No |
| 2 | 3 | No |
| 1 | 4 | Yes |
| 0 | 5 | Yes |

Although this simple test does not indicate the level of corrosion, it does show that the KCl and the DAP do interact to provide reduced corrosion in the presence of a typical mud clay such as bentonite.

In this system, the DAP performs a function as (1) a corrosion inhibitor (2) a bentonite yield inhibitor (both immediate and long term) and (3) a calcium precipitator (making gels, viscosity and water loss less difficult to control).

A preferred amount of diammonium phosphate to be added is about 2.6 pounds per barrel (ppb) of drilling fluid or other to about 5.2 ppb. These amounts correspond to 0.75% and 1.5% by weight, based on 350 pounds per barrel of water. A broad range is from about 0.9 ppb to about 8 ppb of diammonium or other phosphate. Excessive amounts of diammonium phosphate, over 8 ppb, may increase the viscosity of the drilling fluid beyond the desirable limit.

The preferred amount of KCl in the drilling fluids of the present invention will be in the range of from about 7 to about 20 ppb. Broadly, however, KCl in the range of from about 3 to about 35 ppb can be used depending on the circumstances.

Polymers such as sodium carboxymethylcellulose can be advantageously added to the fluid of the invention in amounts up to about 3.5 ppb. Other drilling mud additives such as various clays and the like can also be added. Soluble metal compounds having a valence of two or more should be avoided, however. As mentioned earlier, the present invention is particularly applicable to non-dispersed muds which contain no added thinning materials.

Except for the composition aspect described above, the drilling fluids of the present invention are prepared using conventional means and conventional materials. The order of addition in preparing these fluids is not presently considered critical. When clays such as bentonite are employed, it is frequently beneficial to contact the clay with fresh water first, then incorporate the swollen mixture into the drilling fluid.

The pH of the drilling fluid should be in the general range of 6–10, preferably 7–8. The natural pH of the drilling fluids of this invention will frequently fall in these ranges without the necessity for pH adjustments. At pH values below 6, corrosion may be accelerated, while at pH values above 10 ammonia may be unnecessarily evolved from DAP or related materials. Minor pH adjustment can be made with suitable acids or alkalies as required.

Reasonable variation and modification are possible within the scope of the foregoing disclosure and the appended claims to the invention the essence of which is that a phosphate as described, or its functional equivalent when added to a drilling mud, more especially a drilling mud containing a pitting-type or other corrosion producing components such as potassium chloride, etc., significantly reduces the corrosiveness and in particular, importantly, converts what corrosiveness still exists to a general, as distinguished from a pitting, type; and that a less, corrosion-destructive process for drilling into the ground has therefore been provided.

We claim:
1. A process for inhibiting corrosiveness to metal of an aqueous drilling mud containing a clay and a metal corrosive component selected from the group consisting of potassium chloride, sodium chloride, and sodium sulfate which comprises adding at least one soluble phosphate selected from the group consisting of diam- monium phosphate, monoammonium phosphate, dipotassium phosphate, monosodium phosphate, monolithium phosphate, and dirubidium phosphate to said mud said soluble phosphate added in an amount in the range of about 0.9 pounds per barrel to about 8 pounds per barrel of the mud composition and maintaining said mud at a pH in the range of about 6 to about 10.

2. A process according to claim 1 wherein the additive is diammonium phosphate.

3. A process according to claim 1 wherein the corrosive component is potassium chloride present in an amount of from about 3 to about 35 pounds per barrel.

4. A process according to claim 3 wherein the drilling mud is a bentonite clay drilling mud containing a sodium carboxymethylcellulose polymer.

5. An improved inhibited non-dispersed aqueous drilling mud maintained at a pH of about 6 to about 10 containing a clay and at least one metal corrosive component selected from the group consisting of potassium chloride, sodium chloride and sodium sulfate, said drilling mud also containing an amount of about 0.9 pounds per barrel to about 8 pounds per barrel of the mud composition of soluble phosphate selected from the group consisting of diammonium phosphate, monoammonium phosphate, dipotassium phosphate, monosodium phosphate, monolithium phosphate, and dirubidium phosphate, said phosphate effective significantly to reduce corrosiveness to metal of said composition.

6. A mud according to claim 5 wherein the corrosive component is potassium chloride present in an amount. of from about 3 to about 35 pounds per barrel.

7. A mud according to claim 6 wherein the drilling mud is a bentonite clay drilling mud containing a sodium carboxymethylcellulose polymer.

* * * * *

UNITED STATES PATENT AND TRADEMARK OFFICE
CERTIFICATE OF CORRECTION

PATENT NO. : 4,000,076

DATED : December 28, 1976

INVENTOR(S) : Oliver K. Bodine and Charles A. Sauber

It is certified that error appears in the above-identified patent and that said Letters Patent are hereby corrected as shown below:

Column 3, line 49, "HCl" should be --- KCl ---.

Signed and Sealed this

Thirteenth Day of September 1977

[SEAL]

Attest:

RUTH C. MASON
Attesting Officer

LUTRELLE F. PARKER
Acting Commissioner of Patents and Trademarks